(12) United States Patent  (10) Patent No.: US 7,959,443 B1
Frembgen et al.  (45) Date of Patent: Jun. 14, 2011

(54) LUNG SIMULATOR

(75) Inventors: Stefan Frembgen, Pittsburgh, PA (US); Maik Gremme, Emsdetten (DE)

(73) Assignee: IngMar Medical, Ltd., Pittsburgh, PA (US)

( * ) Notice: Subject to any disclaimer, the term of this patent is extended or adjusted under 35 U.S.C. 154(b) by 1270 days.

(21) Appl. No.: 11/520,025

(22) Filed: Sep. 12, 2006

Related U.S. Application Data

(60) Provisional application No. 60/716,135, filed on Sep. 12, 2005.

(51) Int. Cl.
  *G09B 23/28*  (2006.01)
(52) U.S. Cl. ........................................ 434/265; 434/262
(58) Field of Classification Search .......... 434/262–275; 222/334; 417/269; 134/105
  See application file for complete search history.

(56) References Cited

U.S. PATENT DOCUMENTS

| | | | |
|---|---|---|---|
| 5,941,710 A | 8/1999 | Lampotang et al. | |
| 5,975,748 A | 11/1999 | East, IV et al. | |
| 6,782,900 B2 * | 8/2004 | DeYoung et al. | 134/105 |

OTHER PUBLICATIONS

Denson et al., A Computer-Controlled Patient Simulator, JAMA, Apr. 21, 1969, vol. 208, No. 3.
Lampotang et al., A Lung Model of Carbon Dioxide Concentrations with Mechanical or Spontaneous Ventilation, Critical Care Medicine, 1986, vol. 14, No. 12.

\* cited by examiner

*Primary Examiner* — Xuan M Thai
*Assistant Examiner* — Timothy Musselman
(74) *Attorney, Agent, or Firm* — The Webb Law Firm

(57) ABSTRACT

A system and method of delivering $CO_2$ in a respiration closed-loop control system to a respiratory simulator includes (a) providing a $CO_2$ supply to a respiratory simulator having a piston/cylinder arrangement; (b) providing flow control hardware between the $CO_2$ supply and the piston/cylinder arrangement; (c) generating a first control signal representative of a predefined amount of $CO_2$; and (d) providing the predefined amount of $CO_2$ into the piston/cylinder arrangement. Thereafter, either (i) an end-tidal carbon dioxide partial pressure ($EtCO_2$) value is determined based on an amount of $CO_2$ emptied from the piston/cylinder arrangement during an exhalation phase of the respiratory simulator or (ii) an $EtCO_2$ value is calculated via an equation. A second control signal is generated that is representative of a tidal volume and a breathing frequency representative of a physiological response to the $EtCO_2$ value to effect corresponding movement of the piston in a next inhalation and exhalation phase.

20 Claims, 11 Drawing Sheets

LUNG SIMULATOR

CROSS REFERENCE TO RELATED APPLICATIONS

This application claims the benefit of U.S. Provisional Patent Application No. 60/716,135, filed Sep. 12, 2005, and entitled "Lung Simulator," the contents of which are incorporated herein by reference.

BACKGROUND OF THE INVENTION

1. Field of the Invention

The present invention relates to a lung simulator and, more specifically, to a system for simulating lung performance more realistically by accounting for a hypothetical patient's response to a physiological $CO_2$ partial pressure.

2. Description of Related Art

In recent years, the demographic trend of industrial countries has led to an explosion of health-care costs. A comparison between the trend of health-care costs and the aging of the population shows that a large percentage of this cost increase results from hospital stays by elderly people. The length of these stays can be reduced by optimum care administered in the hospital and by suitable follow-up care of the patient at home. Modern medical technology can make an essential contribution to this care.

One sub-sector of health-care technology is respiratory care. Both in intensive medicine and in the home-care sector, respiratory equipment is utilizing an increasing number of bio-parameters, such as the oxygen or carbon dioxide content in the respiratory air. These parameters can be used, for example, to automate the respiration process. For example, the $EtCO_2$ (end-tidal Carbon Dioxide) value is used in new weaning methods which are designed to wean the patient off the respirator unit as quickly as possible. But in the home-care sector, too, innovations are always being developed to meet the ever-increasing requirements for medical equipment. Equipment innovations must be tested for function, safety and handling. It is also possible to provide better training for future users of the medical equipment with suitable simulators. One of these innovations is the implementation of respiratory regulation in lung simulators based on the $EtCO_2$ value.

As background information relating to the simulation aspects relating to the present invention, the physiological principles of respiration are provided herein. Human respiration reacts differently as a function of external factors. Changes in the ambient conditions, such as the air and the partial pressure, also lead to a change in respiration. The atmospheric ambient air which is required for the maintenance of life has the composition described in the following table.

| Percentage by volume [%] | Type of gas |
|---|---|
| 20.96 | Oxygen [$O_2$] |
| 78.00 | Nitrogen [$N_2$] |
| 0.04 | Carbon dioxide [$CO_2$] |
| 1.00 | Noble gases |

A change in the gas mixture such as, for example, an increase of the $CO_2$ content by 5%, would result in severe respiratory distress. Instead of the percentage by volume, the composition of air is also frequently discussed in terms of pressures or of the partial pressure.

In medical applications, the composition of a gas mixture is described in terms of partial pressures. Air is a mixture of gases, and each individual gas exerts a proportion of the total pressure that corresponds to its percentage by volume. The partial pressure accounted for by the individual gas is the partial pressure. The SI Unit of pressure is Pascal (Pa), although in medicine, the older unit mmHg (millimeters of a column of mercury) is commonly used. The partial pressure is calculated according to Dalton's Law:

$$P_{total} = P_{O2} + P_{N2} + P_{CO2} + P_{Noble\ gases} \quad (1)$$

However, consideration must be given to the fact that the total pressure is influenced by the moisture that is contained in the air, i.e., the water vapor.

The term "water vapor" refers to the water that is in the gas phase. The partial pressure that is produced by the water vapor is a function of the temperature. In respiratory physiology, it is conventional to indicate the partial pressures of the expiration gas (i.e., gas that is exhaled) without any consideration of the water vapor partial pressure. FIG. 1 shows the water vapor partial pressure as a function of the temperature.

In medicine, the temperature is taken into consideration as an essential factor in three measurement conditions. The volume of a given amount of gas is a function of the temperature as well as of the pressure. Therefore, the ambient conditions must always be indicated in measurements or for theoretical considerations. There are three conventional measurement conditions in respiratory physiology. STPD (Standard Temperature, Pressure Dry) conditions are the physical standard conditions at which the volume data are referenced to T=273 K, P=760 mmHg and $P_{H2O}$=0 mmHg (dryness). Under BTPS (Body Temperature, Pressure Dry) conditions, in the lung, T=310 K and "P" is a variable that is linked to the current barometric pressure and $P_{H2O}$=47 mmHg (water vapor saturation at 37° C.). ATPS (Ambient Temperature, Pressure Saturated) conditions take into consideration the current measurement conditions outside the body, i.e., the volume is measured at ambient temperature, current barometric pressure and water vapor saturation. The aforementioned external ambient conditions (i.e., air and partial pressure) have a major influence on the processes in the body. Respiratory function and the respiratory system must adapt to these conditions.

The basic principles of respiratory function and the mechanical action of the respiratory system that takes place during respiration will now be discussed. Defined in very general terms, respiration is the exchange of gas between the cells in the body and the environment. During inspiration, the lung expands so that fresh air reaches the gas exchange areas, the space in which $O_2$ and $CO_2$ are exchanged. The rising of the costal arch during costal respiration or the falling of the diaphragm during abdominal respiration leads to an expansion of volume in the chest cavity. The space created by the volume expansion is used by the lung parts for expansion. The expansion leads to a pressure reduction in the lung and thus to a ventilation of the lung with fresh air. Correspondingly, the lowering of the costal arch or the lifting of the diaphragm leads to a reduction of the volume of the chest cavity and thus to exhalation.

The air travels via the trachea into the two main bronchi and is then distributed to the increasingly smaller branches of the bronchial tract. Structured like a tree, where the trunk represents the trachea, the bronchial tree branches out in a similar fashion. The alveoli begin with the $20^{th}$ branching. This space is used primarily for the exchange of gas and is designated the respiration zone. From this point, the diffusion becomes increasingly important, while previously the dominant factor was convection. The spaces, such as the trachea, that do not participate in the gas exchange are designated anatomical dead space.

The anatomical dead space is the space in which no gas exchange takes place, and is important for an understanding of the individual respiratory gas fractions, in particular of the carbon dioxide fraction. The dead space includes the trachea, the mouth, the nose or the bronchi, the total volume of which is approximately 150 ml in an adult. Assuming that fresh gas is in the dead space, which is expired into the gas that is present in the alveoli, the volume of a specified amount of gas can be described as the product of the volume and the fraction. The dead space can be calculated according to Bohr's Formula.

$$\frac{V_D}{V_E} = \frac{F_{ACO2} - F_{ECO2}}{F_{ACO2}} \quad (2)$$

The dead space can be determined by means of this formula. A change in the size of the dead space can indicate pathological changes. In addition to the dead space, other volumes can be indicators of pathological changes in the respiratory system. As in the definition of the dead space, medical science divides the other volumes into different categories.

For the quantitative measurement of the different lung volumes, the following volume divisions have been selected. In this process, lung volumes for the measurement of which the elapsed time is decisive are defined as "dynamic" volumes. Volumes that are independent of the strength of the respiratory flow (i.e., respiratory flow per unit of time) are designated as "static." Volumes that are composed of two or more volumes are designated "capacity." FIG. 2 shows the different volumes and the related abbreviations indicated therein and hereinafter explained in greater detail. Breath volume, or tidal volume ($V_t$), is the inspiration or expiration volume, which in adults at rest is approximately 500 ml. Inspiration Reserve Volume (IRV) is the volume that can be additionally inhaled after normal inspiration. Expiration Reserve Volume (ERV) is the volume that can additionally be exhaled after a normal expiration. Residual Volume (RV) is the volume that remains in the lung after maximal expiration. Vital Capacity (VC) is the maximum volume that can be exhaled after normal expiration. Inspiration Capacity (IC) is the maximum volume that can be inhaled after normal expiration. Functional Residual Capacity (FRC) is the volume that is still contained in the lung after normal expiration. Total Capacity (TLC) is the maximum possible lung volume.

The FRC is important for an understanding of the equalization of the inspiration and expiration $O_2$ and $CO_2$ fraction, and for the objective of the present invention. If the fresh air were to flow directly into the alveoli without mixing with the residual volume contained in the lung, the respiratory gas fraction there would increase or decrease after every respiration phase. As a result of the greater residual volume, which is up to three times greater than the tidal volume, and the mixing effect that thereby occurs, only slight temporal fluctuations of the breathable gas fraction occur in the alveoli. Thus, the composition of the exhaled breathable air remains relatively constant. Together with the respiration frequency, the breath volume provides an additional important definition of respiratory physiology.

The respiratory minute volume (MV) is the product of the tidal volume or flow volume and the respiration frequency, and in a healthy adult at rest is approximately 7 liters per minute and increases under stress. The respiratory minute volume is an active component in determining how sharply $P_{AO2}$ and $P_{ACO2}$ increase and decrease, although in isolation it is not an indicator of the effectiveness of the ventilation. If the composition of the dead space is taken into consideration, and assuming a rapid and very flat respiration with a tidal volume of 0.2 liters and a respiration frequency of 35 breaths per minute, there would be little or no ventilation of the alveolar space with fresh air. The alveolar ventilation (portion of the respiratory time volume that benefits the alveoli) is accordingly the defining variable.

The magnitude of the various volumes such as tidal volume and/or the respiratory minute volume is influenced by the respiratory mechanics. The term "respiratory mechanics" refers to the pressure-volume, the pressure-flow and the pressure-time and flow-time relationship. The four most important parameters of respiratory mechanics are compliance, resistance, respiration work and the I:E ratio. These parameters are important both on account of their changes in response to pathological conditions and on account of their usefulness as initiating points for accomplishing the objectives of the present invention.

The I:E ratio provides information on the ratio of the inspiration time and expiration time. FIG. 3 depicts a schematic illustration of the I:E ratio during respiration. Physiological values for the I:E ratio are between 1:1.5 and 1:2.5. In respiratory care, attempts are made to counteract pathological changes by effecting controlled changes in the positioning of the I:E ratio on the respirator. The ratio is influenced by, among other things, compliance and resistance.

Compliance is a measurement of the elastic properties of the respiratory apparatus. As a result of its elastic parenchymal cells and the surface tension of the alveoli, the lung is subject to tensile stress and is always attempting to reduce its volume. Work must be performed to overcome this tensile stress during inspiration. During expiration, the retraction of the lungs occurs largely passively. The following equations apply:

Compliance of Thorax and Lungs:

$$C_{TH+L} = \frac{V}{P_{Pul}} \quad (3)$$

Compliance of the Thorax
Compliance of the Lung:

$$C_{TH} = \frac{V}{P_{Pleu}} \quad (4)$$

$$C_L = \frac{\partial V}{\partial (P_{Pul} - P_{Pleu})} \quad (5)$$

The relationship among the three equations is:

$$\frac{1}{C_{TH+L}} = \frac{1}{C_L} + \frac{1}{C_{TH}} \quad (6)$$

The measurement presents problems in actual practice, because the respiratory musculature has to be disregarded for this purpose. Generally, only the lung compliance $C_L$ is determined, so that after the inspiration, a defined volume of the larynx is opened, and simultaneously the pressure in the alveoli equals the atmospheric pressure. Equation (6) can then be simplified to:

$$C_L = \frac{\Delta V}{\Delta P_{Pleu}} \qquad (7)$$

The resistance of the non-elastic respiratory tract is composed of fractions including (1) flow resistances in the respiratory system; (2) non-elastic tissue resistance; and (3) inertia. In this case, the flow resistance of the respiratory system accounts for 90% of the total resistance, which means that the other two factors can be ignored for our purposes. The driving force for the flow is the pressure difference between the atmosphere and the alveoli. Both turbulent and laminar flows are present in the respiratory system. For the laminar flow, the Hagen-Poiseuille Law applies and, although it does not apply for turbulent flow, this law can be used for the total flow resistance.

$$\dot{V} = \frac{\Delta P}{R} \qquad (8)$$

In the equation presented above, "R" is the respiratory system resistance and is a function of the viscosity of the gas, the length of the respiratory system and the cross section of the respiratory system. The cross section of the respiratory system is thereby decisive in obstructive diseases of the respiratory system and is proportional to the fourth power of the radius of the respiratory tract. Consequently the resistance of the respiratory tract increases by a factor of sixteen when the radius of the respiratory tract is reduced by one-half. Resistance and compliance together are deciding factors in the respiratory work that a person must perform during respiration.

Physical work is defined during respiration by the product "Pressure×Volume," and is the work that must be performed to overcome the elastic and viscous resistance. In general, the following relationship applies:

$$W = \int PdV \qquad (9)$$

FIG. 4 shows a pressure-volume curve during normal respiration at rest. The tidal volume is plotted on the ordinate, and the pressure difference between the atmosphere and the pleural cavity is plotted on the abscissa. At point "A," there are no muscle forces that are producing pressure. The curve "AXB" corresponds to the inspiration. The work that is expended during inspiration is composed of "elastic work" and "friction work." The expiration occurs passively, and the respiratory work required to overcome the flow resistances is taken over by the lung tissues (area "ABC") that were previously extended. The respiratory mechanism is what provides for the actual function of respiration, the pulmonary gas exchange that makes it possible to supply the body with oxygen and the elimination of the decomposition products.

The pulmonary gas exchange describes $O_2$ absorption and $CO_2$ released by the blood from and to the alveolar air. The $O_2$ absorption results from the quantity of $O_2$ added, minus the quantity exhaled. The $CO_2$ released from the blood equals the quantity of $CO_2$ removed from the alveoli, i.e., exhaled. The gas exchange occurs by diffusion between the alveoli and the lung capillary blood. This process is described by Fick's First Law:

$$j = D\frac{\partial c}{\partial x} \qquad (10)$$

Equation (10) indicates the magnitude of the particle flow ($O_2$ and $CO_2$ molecules). The particle flow is a function of the surface area and type of the diffusion medium (lung tissue) and of the temperature and concentration difference (difference between lung capillary blood and alveoli). The difference in concentration is directly proportional to the pressure difference of the respiratory gas fractions and the particle flow is therefore a function of the respiratory air that is supplied. The $CO_2$ diffusion coefficient is approximately 23 times higher than that of oxygen, so that sufficient $CO_2$ can be removed in spite of small $CO_2$ partial pressure differences.

The oxygen absorbed by the blood is transported to the cells where it is converted into energy with the help of enzymes (consumption of $O_2$). This process is called "metabolism." The metabolic product which is generated is carbon dioxide and is in turn given up via the blood circulation to the lungs. The ratio between the $CO_2$ released and $O_2$ consumed is termed the Respiratory Quotient (RQ). In healthy individuals, the RQ is between 0.8 and 0.9. Normal values for $CO_2$ release are in a range of approximately 300 ml per minute; the corresponding $O_2$ consumption is approximately 250 ml per minute. An increasing $CO_2$ production always results in an increasing $O_2$ consumption, which can be triggered by physical exertion, among other things. The body needs more energy and therefore produces more $CO_2$. The process of oxygen consumption and $CO_2$ release is automated in all mammals and is subject to respiratory regulation.

Respiration is for the most part regulated by arterial chemo receptors. Sensors of this type are located in the glomus caroticum, in the aortic arches and in the brain stem itself. The $PaCO_2$, $PaO_2$ and the pH are recorded. When the $PaCO_2$ or pH increases, or if the $PaO_2$ value decreases, the respiratory minute volume increases. On the other hand, an increase in the $O_2$ partial pressure leads only to a slight drop in ventilation. FIG. 5 shows the respiratory responses for different partial pressures of oxygen and carbon dioxide. In this case, the arterial $CO_2$ partial pressure is probably the most effective driver of respiration. High $CO_2$ partial pressures in humans are connected with a feeling of shortness of breath, until a narcotic effect occurs at values higher than 70 mmHg. As a result of the increased respiratory minute volume, the carbon dioxide diffused from the blood into the alveoli is exhaled, which leads to a drop in the arterial $CO_2$ partial pressure. The partial pressure is therefore a function of the respiratory minute volume; on the other hand, the respiratory minute volume is a function of the partial pressure. Dependencies of this type are termed a closed-loop control system in both biology and in engineering. A closed-loop control system is a system that works automatically to control conditions and processes. In respiration it works, among other things, to keep the arterial $CO_2$ partial pressure constant.

The central and reflective factors on respiration that contribute to respiratory regulation merit a more complete explanation here. As a result of these factors, gas transport and gas exchange are guaranteed only when the respiratory movements and cardiovascular functions work in harmony with one another. The cardiac output volume must be increased under stress, and actions such as coughing or sneezing require precise coordination with respiration. The central and reflective factors are not discussed in any further detail. Rather, the complex mechanism of respiration is simplified to make a simulation thereof possible.

Capnometry is the measurement of carbon dioxide. Capnography is the graphic representation of the $CO_2$ measurement. In medicine, these measurement methods are used to measure the $CO_2$ concentration of the expiration air and to indicate the $CO_2$ concentration by recalculations in the form of partial pressure. The graphically illustrated curve, the capnogram, gives the medical technician information on $CO_2$ production, pulmonary perfusion, alveolar ventilation and carbon dioxide elimination. The capnogram includes four segments. FIG. 6 shows a schematic capnogram and its constituent parts. Numeral 1 indicates the beginning of expiration, in which a $CO_2$ concentration of zero is measured, which corresponds to the proportion of the gas that does not participate in the gas exchange. Numeral 2 indicates an area in which an increasing concentration is measured, which results from the mixed air from the anatomical dead space and the alveoli that participate in the gas exchange. Numeral 3 indicates an area known as the $EtCO_2$ concentration. Numeral 4 indicates the inspiration phase, in which fresh air is detected which has a $CO_2$ carbon dioxide concentration of practically zero.

The $EtCO_2$ partial pressure in a healthy subject is between 25-40 mmHg, with an average of 36 mmHg. With a $CO_2$ production of 300 ml and a respiration frequency of f=12 breaths per minute, the calculated $CO_2$ release in the expiration air is 25 ml $CO_2$ per respiration cycle. According to Formula (I) and an assumed tidal volume of 500 ml, the calculated $EtCO_2$ value is 38 mmHg. The arterial $CO_2$ partial pressure is 3-7 mmHg above the end-tidal partial pressure.

Desirably, the physiological basis of respiration should be similarly implemented in detail such that the respiratory response to a $CO_2$ partial pressure can be accurately simulated. Areas of application of lung simulators are the testing of respiratory equipment and the training of medical personnel. These simulators are also used in research and development as lung models for the validation of new equipment and therapeutic procedures. Basically, there are two types of lung simulators-simulation of lung mechanics by means of bellows and simulation of lung mechanics by means of a piston and cylinder.

Innovative therapeutic procedures, respiration modes and other innovations always create new requirements for the technology of lung simulators. Simply simulating respiratory mechanics is no longer sufficient. Lung simulators that perform the tasks of the lung such as gas exchange or respiratory regulation are required. For the technological implementation of these requirements, methods must be defined and implemented that can realize the metabolism of oxygen and carbon dioxide. Three exemplary methods are fuel cell technology, molecular sieve and combustion. Prior research and tests on these three methods have shown that their implementation in a lung simulator is too dangerous, complicated or expensive. The state of the art is to simulate the respiratory gas by mixing gases. The air drawn into the lung simulator during the inspiration is "ejected" and replaced by a mixture of gases consisting of $CO_2$, $N_2$ and $O_2$. Market research has shown that, for the majority of potential customers of lung simulators, the simulation of the respiratory response to a physiological $CO_2$ partial pressure may be sufficient.

For the simulation of the respiratory response, it is first necessary to describe the relatively complicated process of respiratory regulation on the basis of a simplified model. FIG. 7 depicts a simplified block diagram of a closed-loop control system to illustrate the processes associated with respiration.

The metabolism represents cell respiration, the part in which, by way of the consumed oxygen, energy is provided for the body and carbon dioxide is formed as a decomposition product. $CO_2$ diffuses from the oxygen-poor blood into the alveolar air. The arrow that exits the lung-heart system represents the respiratory gases (expiration/inspiration). After the blood has been saturated with oxygen and the $CO_2$ has been eliminated, the blood continues to flow through the body and to supply it with $O_2$. The arterial, oxygen-rich blood flows through the chemo-receptors which register the pH as well as the arterial oxygen and $CO_2$ partial pressure. If this value deviates from the specified value, receptors emit a signal which increases or decreases the tidal volume and respiration frequency. The changed respiratory minute volume also changes the rate of elimination of carbon dioxide and the consumption rate of oxygen, so that the measured partial pressures once again correspond to the specified range of values. The respiratory minute volume is composed of the respiration frequency and tidal volume. The respiration frequency and tidal volume have a variance which is a function of sex, age, state of health, size, weight and fitness. Independent of the factors listed above, however, the respiration frequency and tidal volume are in a linear relationship with the $CO_2$ content. However, the increases of respiration frequency and tidal volume are different and are a function of the factors cited above.

FIG. 8 shows one example of the response of the parameters of tidal volume (C), frequency (B), respiratory minute volume (A) and $EtCO_2$ partial pressure (D). The illustrated extract originates from six young, healthy men, although it is not representative. The analysis of graphs "B" and "C" shows a linear increase with increasing $CO_2$. The $EtCO_2$ partial pressure experiences only a slight increase with increasing $CO_2$ flow. If the respiratory minute volume did not increase in spite of increased $CO_2$ production, that would lead to a supersaturation (acidosis) of the blood and therefore to serious complications. If the stress does not continue to increase, the $CO_2$ production does not continue to increase either, which means that an equilibrium is established between the $CO_2$ partial pressure and the respiratory minute volume.

FIG. 9 shows that under constant stress, the respiratory minute volume increases and reaches a plateau when there is equilibrium between respiratory minute volume (MV) and $CO_2$ partial pressure. When the test subject is then no longer subjected to stress, the respiratory minute volume decreases rapidly relative to the increase until normal values are reached.

In summary, the human respiratory system responds, among other parameters, to changes in the metabolic rate by appropriately altering both breath rate (bpm) and tidal volume (Vt) of each breath. It has been determined that $CO_2$ partial pressures in the blood are, aside from $O_2$ levels, the most significant parameters in a control system. The target for the combination of bpm and Vt attained is determined by the minimum amount of respiratory work to be performed, following a principle of energy conservation often found in natural processes. For the purpose of simulating a self-regulating respiratory system, the response of a patient to $CO_2$ has been modeled and implemented in the past using a conventional bellows-based lung model modified to generate patient breathing effort. The resulting human patient simulators (HPS) have used gas substitution as their method of generating true-to-life exhaled gas compositions. The delivery of $CO_2$ simulating a patient's exhaled $CO_2$ for the purpose of generating an approximately true-to-life reading in capnography equipment connected to respiratory simulators has been described and used for a considerable amount of time. To improve the distribution of $CO_2$ injected into a lung simulator bellow, small fans have been used. The waveform of $CO_2$ and readings for the monitoring parameter $EtCO_2$ are compromised when a lung model with a small FRC or dead space compared to an actual patient is used. Gas substitution is a complex method for generating exhaled gas compositions in a human patient simulator and exceeds the required fidelity in many cases.

As previously discussed, lung simulators play an important role in product qualification of respiratory devices. Additionally, lung simulators may be used to teach ventilator management to respiratory therapists. Therefore, it is desirable to make advances in the field of lung simulators by improving the lung simulation to be more realistic by accounting for a patient's response to a physiological $CO_2$ partial pressure, for example.

SUMMARY OF THE INVENTION

The present invention provides for the ability to simulate the respiratory response to an $EtCO_2$ partial pressure. Desirably, this simulation is accomplished by adapting the hardware and software of an existing lung simulator. Generally, under the control of a closed-loop control system, a respiration frequency and a tidal volume are adjusted as a function of the measured or calculated $CO_2$ partial pressure until a "normal" partial pressure is re-established. More specifically, the release of $CO_2$ is synchronized with the breath phase of the simulator. During expiration, the gas is detected and measured by an infrared sensor. The reading is returned to the simulation control loop as a $CO_2$ partial pressure. Depending on the adjusted nominal value ($CO_2$ target), the breathing frequency and tidal volume are adjusted in relation to the measured $EtCO_2$. The amplitude and slope of the breathing frequency and tidal volume transients may be similar to values found in medical studies.

The present invention synchronizes the delivery of $CO_2$ with the breathing pattern of the simulator, effectively creating a pulsed $CO_2$ delivery. In a desirable embodiment, this objective is accomplished by starting the delivery at the beginning of an inhalation and ending it approximately when the inhalation stroke is completed. This ensures that the maximum time for the mixing of $CO_2$ with the air in the cylinder is available. The amount of required $CO_2$ flow is calculated with the parameters of LE ratio and $CO_2$ production, which is a function of a patient's metabolic rate. In an alternate embodiment, a proportional electromagnetic valve used for delivery of the $CO_2$ is substituted by an on-off valve that is pulsed to generate variable output via pulse-width modulation. The result, in both cases, is an infusion of $CO_2$ representative of the concentrations that may be expected in an actual patient. An additional benefit of the present invention is that it will also provide real-time expiratory $CO_2$ curves closely matching patterns observed in actual patients. Time delays, due to the valve actuation, are also taken into account when generating the $CO_2$ delivery valve control signal. The invention further implements algorithms appropriate to represent a variety of patient pathologies, whereby both respiratory rate and tidal volume are adjusted according to the lead parameter of $CO_2$ partial pressure, as approximated by the measurable parameter of $EtCO_2$ of the cylinder/piston-based active servo lung simulator.

In a first embodiment, the present invention uses both a $CO_2$ measuring and $CO_2$ delivery system for verification or calibration of an external monitoring/measuring system for $CO_2$, as such exist in patient monitoring equipment and high-end lung ventilators. The breathing pattern of the active servo lung simulator may be based on the algorithm for patient respiratory response and the level of $EtCO_2$ measured in the airway connecting to the lung simulator.

In a second embodiment, the present invention saves the expense for a capnography system as part of the respiratory simulator. The resulting $EtCO_2$ values are, as opposed to the measured values in the first embodiment, calculated and predicted from data available from the simulator (e.g., tidal volumes, breathing frequency, etc.). This $CO_2$ delivery system uses a regulated valve design (i.e., pressure drop from a known input pressure controlled with a feedback loop, allowing flow via a precision orifice). This design generally ensures the predictability of $CO_2$ flow necessary for calculation of $EtCO_2$ without actual measurement thereof. The use of a regulated valve also eliminates the time consuming and, therefore, costly step of accurately mapping the response of each proportional metering valve being used in each simulator device and re-calibrating this response at preventive maintenance intervals.

In a third embodiment, the $CO_2$ values of the present invention are calculated without actual $CO_2$ delivery and without a capnography system, while using the same patient response algorithms regarding increases or decreases in the predicted $EtCO_2$. For simple training purposes, where no additional monitoring equipment is attached to the active servo lung simulator that would depend on the presence of actual $CO_2$, this method retains the benefits of a realistic patient response (i.e., breathing patterns changing with a change in $EtCO_2$ values) while not requiring any additional hardware for implementation. This saves a substantial investment for the user who does not need the presence of $CO_2$, for example, in training applications.

In summary, the present invention is a system for delivering $CO_2$ in a respiration closed-loop control system to a respiratory simulator. The system includes (a) a piston/cylinder arrangement having a first inlet for receiving air, a second inlet for receiving $CO_2$, and an outlet for releasing the air and $CO_2$ therethrough; (b) a $CO_2$ supply connected to the piston/cylinder arrangement via a fluid path; (c) a valve situated along the fluid path between the $CO_2$ supply and the piston/cylinder arrangement; (d) a diffusing surface situated within the piston/cylinder arrangement for distributing the $CO_2$ across a cross-sectional plane of the cylinder; and (e) a controller configured to actuate the valve to allow a predefined amount of $CO_2$ to flow into the piston/cylinder arrangement, and configured to receive a first control signal representative of the predefined amount of $CO_2$.

Desirably, the cross-sectional plane of the cylinder is substantially parallel to a planar surface of the piston. The diffusing surface is either (i) a substantially tubular structure connected to the fluid path and situated on the planar surface of the piston in a substantially spiral arrangement, wherein the tubular structure includes a plurality of holes for accommodating the $CO_2$ therethrough, or (ii) a permeable membrane connected to the fluid path and situated on the planar surface of the piston, wherein the permeable membrane is adapted to transmit the $CO_2$ therethrough. Desirably, the valve is either a proportional valve or an on/off valve adapted to provide pulse-width modulation. The $CO_2$ is released substantially across either a surface of the piston or a side of the cylinder opposite from the surface of the piston.

The system may also include a computing unit connected to the controller, wherein the computing unit is configured to transmit the first control signal to the controller, and either (i) determine an end-tidal carbon dioxide partial pressure ($EtCO_2$) value based on an amount of $CO_2$ emptied from the piston/cylinder arrangement during an exhalation phase during an exhalation phase of the respiratory simulator, or (ii) calculate an end-tidal carbon dioxide partial pressure ($EtCO_2$) value. Generally, the computing unit may include software operative for calculating the $EtCO_2$ value by an equation. In addition to generating the first control signal, the computing unit may also be configured to generate a second control signal representative of a tidal volume and a breathing frequency representative of a physiological response to the $EtCO_2$ value to effect corresponding movement of the piston in a next inhalation and exhalation phase.

An infrared sensor may be fluidly connected to the respiratory simulator, wherein the infrared simulator is configured to measure the amount of $CO_2$ emptied from the piston/cylinder arrangement. The amount of $CO_2$ is a function of moved volume and concentration of the $CO_2$ emptied from the piston/cylinder arrangement. The system may also include a pressure reducer situated along the fluid path between the $CO_2$ supply and the valve, and an amplifier situated in electrical communication between the computing unit and the valve.

The present invention also includes a method of delivering $CO_2$ in a respiration closed-loop control system to a respiratory simulator having a piston/cylinder arrangement. The method includes (a) providing a $CO_2$ supply to the respiratory simulator having a piston/cylinder arrangement; (b) providing flow control hardware between the $CO_2$ supply and the piston/cylinder arrangement; (c) generating a first control signal representative of a predefined amount of $CO_2$; (d) moving the piston in a first direction to draw air into the piston/cylinder arrangement; (e) providing the predefined amount of $CO_2$ into the piston/cylinder arrangement to mix the $CO_2$ and the air, whereby the release of the $CO_2$ is synchronized with a breathing pattern of the respiratory simulator; and (f) moving the piston in a second direction to empty at least a portion of the $CO_2$ and the air from the piston/cylinder arrangement. Desirably, the predefined amount of $CO_2$ is released into the piston/cylinder arrangement during an inhalation phase of the respiratory simulator. Thereafter, either (i) an end-tidal carbon dioxide partial pressure ($EtCO_2$) value is determined based on an amount of $CO_2$ emptied from the piston/cylinder arrangement during an exhalation phase of the respiratory simulator or (i) an end-tidal carbon dioxide partial pressure ($EtCO_2$) value is calculated via an equation. A second control signal is generated that is representative of a tidal volume and a breathing frequency representative of a physiological response to the $EtCO_2$ value to effect corresponding movement of the piston in a next inhalation and exhalation phase. The second control signal may be further generated based upon a predefined patient respiratory breathing profile.

The present invention also includes a method of simulating $CO_2$ flow in a respiration closed-loop control system. The method includes (a) generating a first value representative of a predefined amount of $CO_2$; (b) simulating the release of the predefined amount of $CO_2$ into a lung in an inhalation phase; (c) calculating an end-tidal carbon dioxide partial pressure ($EtCO_2$) value based upon an amount of simulated $CO_2$ emptied from the lung using an equation; and (d) generating a second value representative of a tidal volume and a breathing frequency representative of a physiological response to the $EtCO_2$ value to generate a second value representative of another predefined amount of $CO_2$ for simulated release into the lung in a next inhalation phase.

Still other desirable features of the invention will become apparent to those of ordinary skill in the art upon reading and understanding the following detailed description, taken with the accompanying drawings, wherein like reference numerals represent like elements throughout.

DETAILED DESCRIPTION OF THE INVENTION

Figure 1:
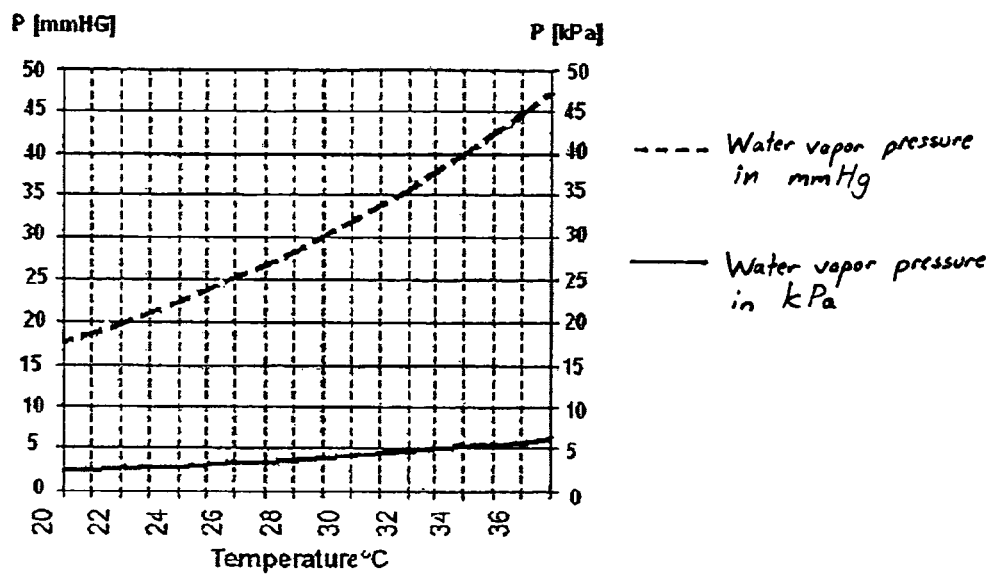
FIG. 1 is a graph of water vapor partial pressure as a function of temperature at saturation.
Figure 2:
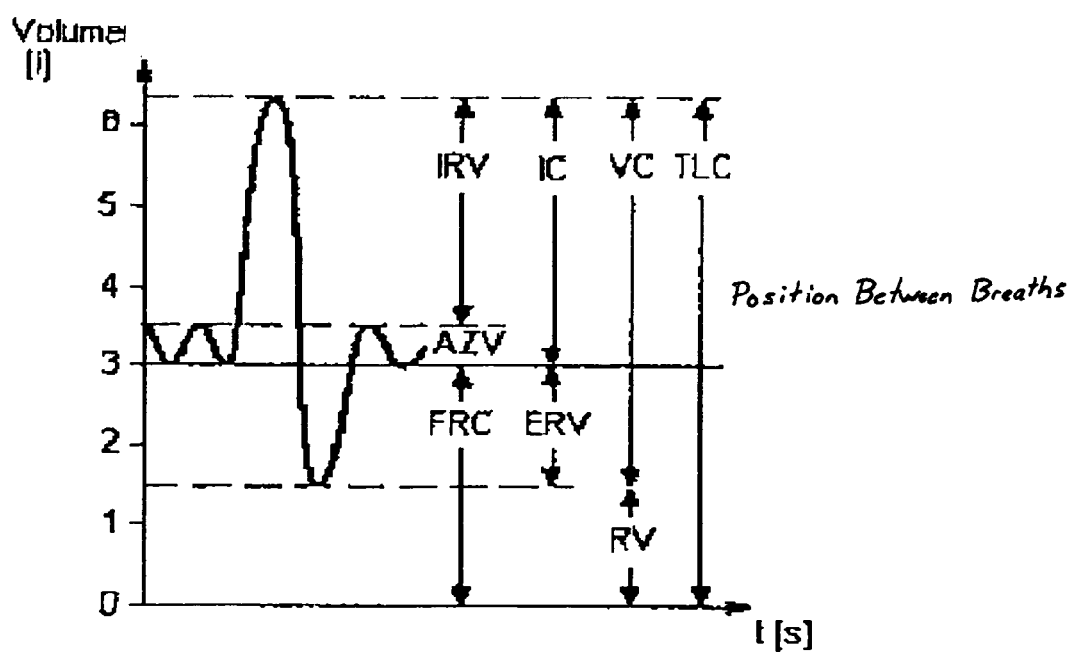
FIG. 2 is a graph of various lung volumes as a function of time during a breathing cycle.
Figure 3:
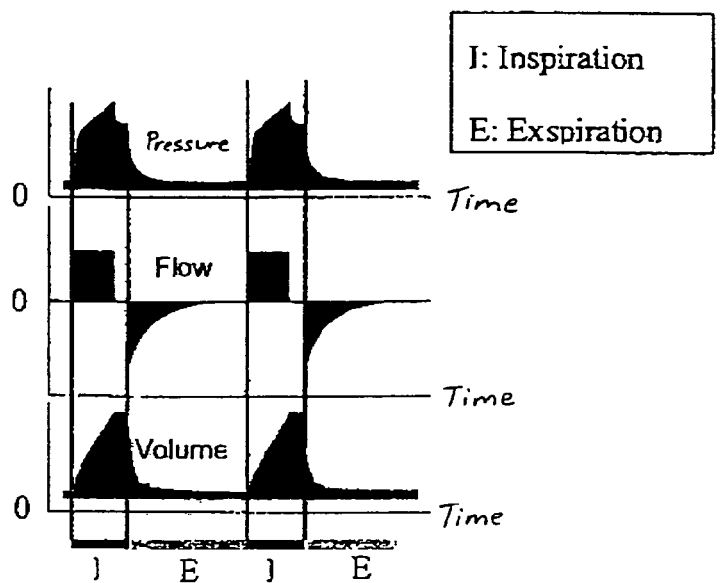
FIG. 3 is a graph of an I:E ratio during respiration.
Figure 4:
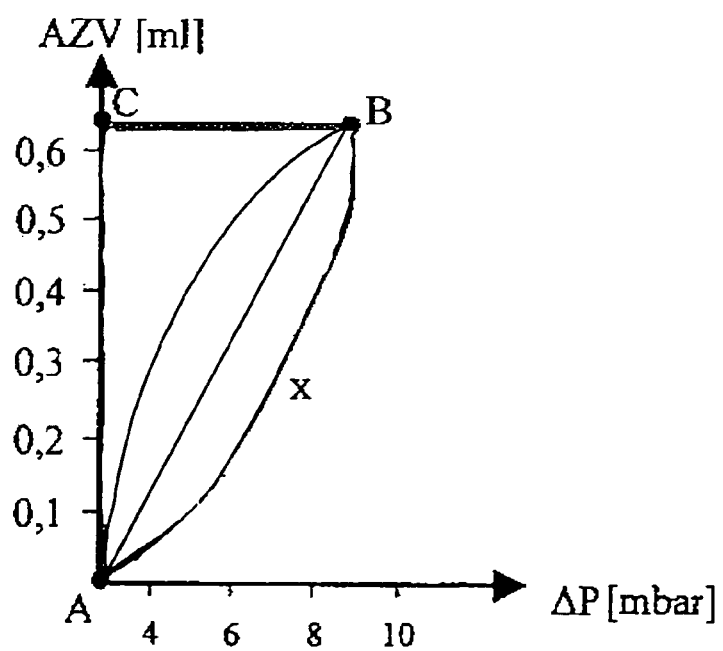
FIG. 4 is a graph of a pressure volume curve during respiration at rest.
Figure 5:
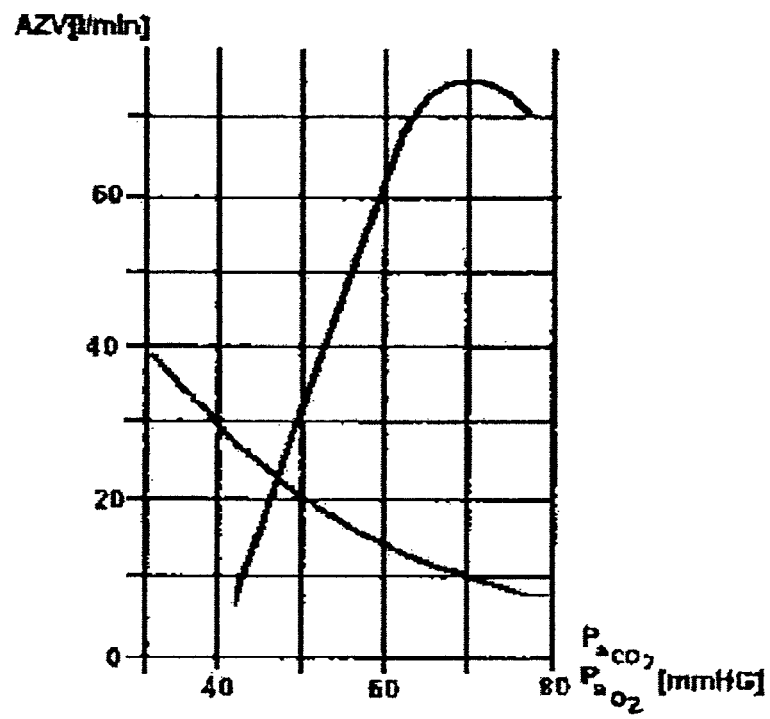
FIG. 5 is a graph of a respiratory response as a function of $CO_2$ and $O_2$ partial pressure.
Figure 6:
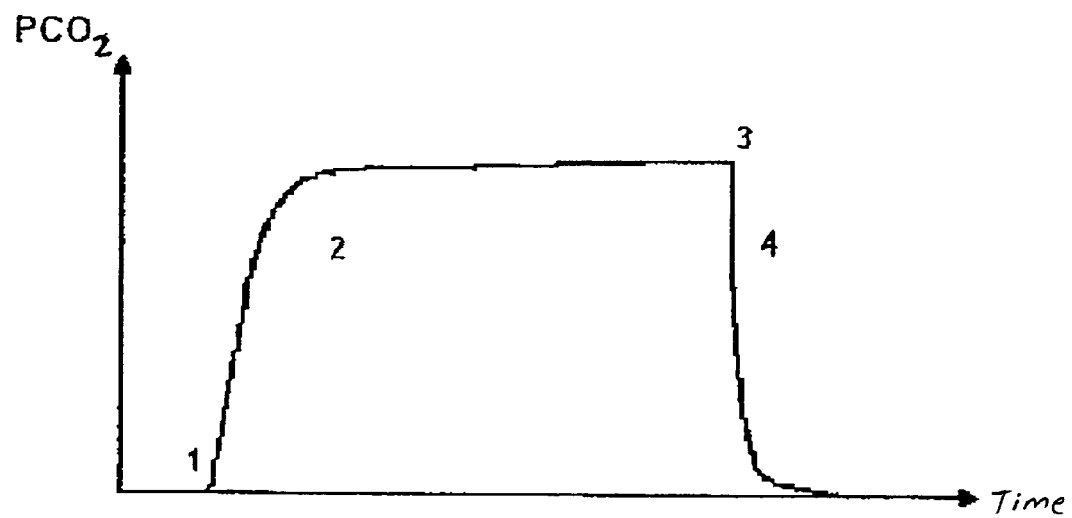
FIG. 6 is a graph of a capnogram.

For purposes of the description hereinafter, spatial or directional terms shall relate to the invention as it is oriented in the drawing figures. However, it is to be understood that the invention may assume various alternative variations, except where expressly specified to the contrary. It is also to be understood that the specific apparatus illustrated in the attached drawings, and described in the following specification, are simply exemplary embodiments of the invention. Hence, specific dimensions and other physical characteristics related to the embodiments disclosed herein are not to be considered as limiting.

In a desirable embodiment, the present invention is implemented in connection with an existing lung simulator that provides a physical representation of the equation of motion with respect to the human lung, namely, $P_{vent}+P_{mus}=V\times R+V\times 1/C$. An exemplary lung simulator for use with the present invention is the Active Servo Lung 5000 (ASL 5000), marketed by IngMar Medical, Ltd. of Pittsburgh, Pa. The general principle of operation of the ASL 5000 is described in detail in U.S. Pat. No. 5,975,748 to East, I V et al., the contents of which is incorporated herein by reference.

As discussed in the '748 patent, the ASL 5000 simulates lung parameters R and C by appropriate piston movement in response to pressure changes. This movement is digitally controlled without the use of springs or orifices, thereby achieving precision and versatility. Simulations are performed by executing the necessary calculations in a 2 kHz servo loop and moving the piston accordingly. A pressure sensor measures pressure for the purpose of analysis. Additionally, the pressure sensor is part of a feedback loop that translates pressure changes into piston movement. The ASL 5000 includes a motor used to generate spontaneous respiratory activity corresponding to transalveolar pressures. A controller, either external or internal to the ASL 5000, may be configured to receive data for compliance, resistance, respiration frequency and other parameters to control movements of the piston. A computer, such as a personal computer, is connected to the controller and is configured to receive simulation data therefrom. A pressure transducer registers the pressure fluctuations during the simulation in a cylinder and transmits them to the controller, which sends them back to the computer for the display of the data. The flow, volume and pressure curve can be represented via Equations (11).

$$\dot{V} = P \cdot R$$

$$V = P \cdot C \tag{11}$$

where $\dot{V}$ is the flow, "V" the volume, "C" and "R" the values for compliance and resistance respectively previously entered via the software and "P" is the measured pressure. The data used are displayed in real time and can also be modified during the simulation. The computer may be used to transmit model parameters and breath profiles (e.g., pre-recorded patient breathing patterns representative of muscular effort) to the ASL 5000. With the feedback turned off, the ASL 5000 may operate as a precision flow waveform generator. User-generated model parameters can be set interactively or from script files to incrementally change over time (e.g., real-time breath to breath). In addition, these parameters may be controlled via an Extended Input Provider interface, drawing from custom user software designed to generate patient dynamics.

Although the present invention will be discussed in connection with the aforementioned ASL 5000, it is to be understood that the present invention may be used with any other suitable computer-controlled breathing simulator, especially such a simulator that accurately simulates parameters such as resistance and compliance. According to a desirable embodiment, the present invention utilizes existing lung simulator components with modifications made to the software and hardware thereof for the purpose of simulating a physiological reaction of the respiration to an existing $CO_2$ partial pressure.

Figure 10:
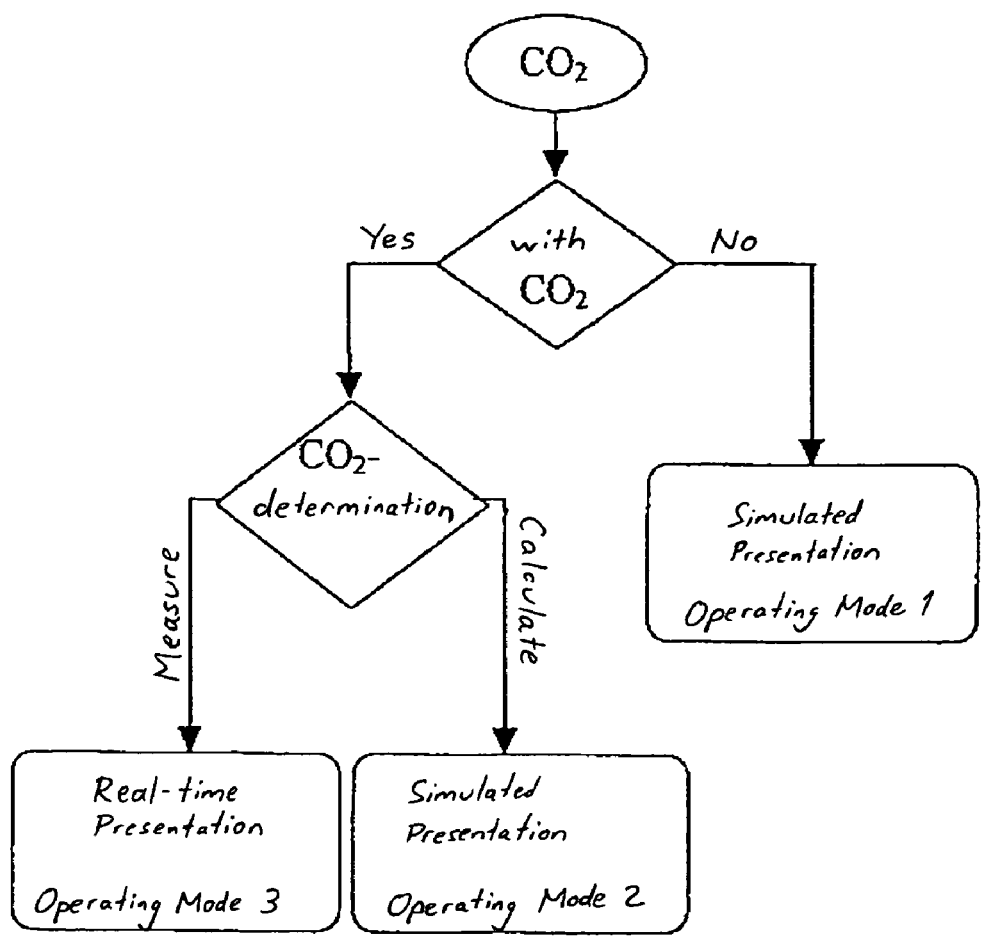
FIG. 10 is a flow-chart for selecting operating modes of the present invention.

The present invention provides for three operating modes that are available for the simulation of the $CO_2$ response. These three operating modes correspond to different simulation requirements, namely, the measurement of the $CO_2$ partial pressure, the calculation of the $CO_2$ partial pressure and the simulation of the $CO_2$ flow. These operating modes allow the lung simulation to be used in the areas of development, training and teaching, for example, so that the use of carbon dioxide is not necessary when the system is used as a teaching tool. FIG. 10 depicts the ability to select between the various operating modes. For example, in Operating Mode 1, the simulator does not use $CO_2$, but rather the $CO_2$ flow is simulated, and the software then calculates a $CO_2$ partial pressure. In Operating Mode 2, the simulation is conducted with $CO_2$. The same algorithm used in Operating Mode 1 may be used for the calculation of the $CO_2$ partial pressure. The Operating Mode 2 also addresses the $CO_2$ flow control. In this operating mode, external units that determine the $CO_2$ partial pressure may be used. For example, it is possible to record capnograms of the respiratory air expired from the simulator. In Operating Mode 3, the $CO_2$ partial pressure ($EtCO_2$) is measured with an infrared sensor. The measured $EtCO_2$ value is transmitted to the control algorithm which is integrated in the software. The control algorithm controls the tidal volume as well as the respiration frequency, and a capnogram recorded by the sensor is simultaneously displayed.

Figures 11A, 11B:
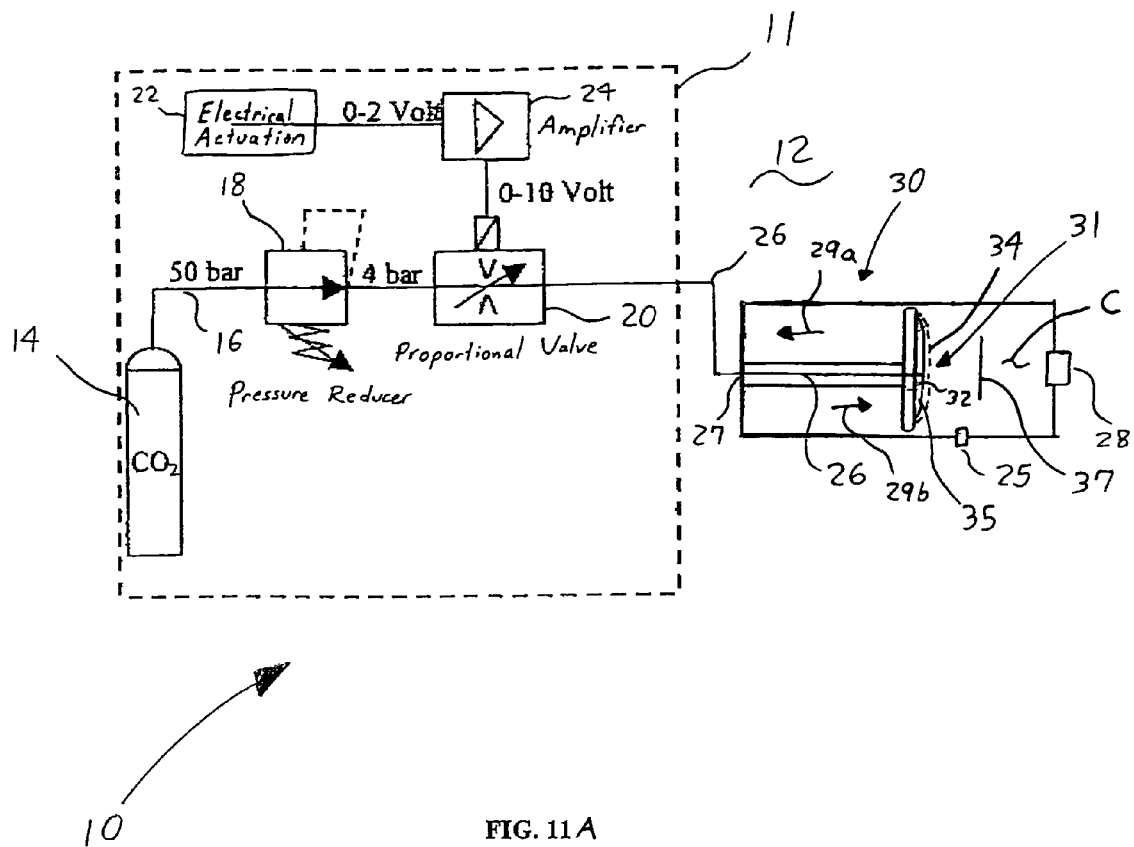
FIG. 11A is a schematic of $CO_2$ flow control hardware in accordance with the present invention.
FIG. 11B is a top plan view of a piston of a piston/cylinder arrangement for use with the flow control hardware of FIG. 11A.

As shown in FIG. 11A, the present invention utilizes flow control hardware 10 which controls and introduces the desired quantity of $CO_2$ into the system. The area inside the broken line represents $CO_2$ flow control 11, and the area outside the broken line represents the $CO_2$ application 12. The $CO_2$ is extracted from a bottle 14 under a pressure of 50 bar. For the simulation, industrial $CO_2$ with a purity of 99.9% may be used. A hose connection 16 conducts the $CO_2$ to an adjustable pressure-reducer 18.

The pressure reducer 18 reduces the pressure from 50 bar to 4 bar. The pressure reducer 18 protects the downstream components from excessive pressure. The pressure reducer 18 also influences the $CO_2$ flow rate via adjustable pressure on the secondary side, so that the $CO_2$ flow increases with increasing secondary pressure. The pressure reducer 18 also keeps the secondary pressure constant. Desirably, the pressure on the output side of the pressure reducer 18 should keep the specified pressure constant regardless of the input pressure. In the exemplary embodiment, the secondary pressure of 4 bar was selected so that the pressure is low enough not to destroy any of the downstream components, but is high enough to achieve the $CO_2$ flow required for the simulation.

Figure 12:
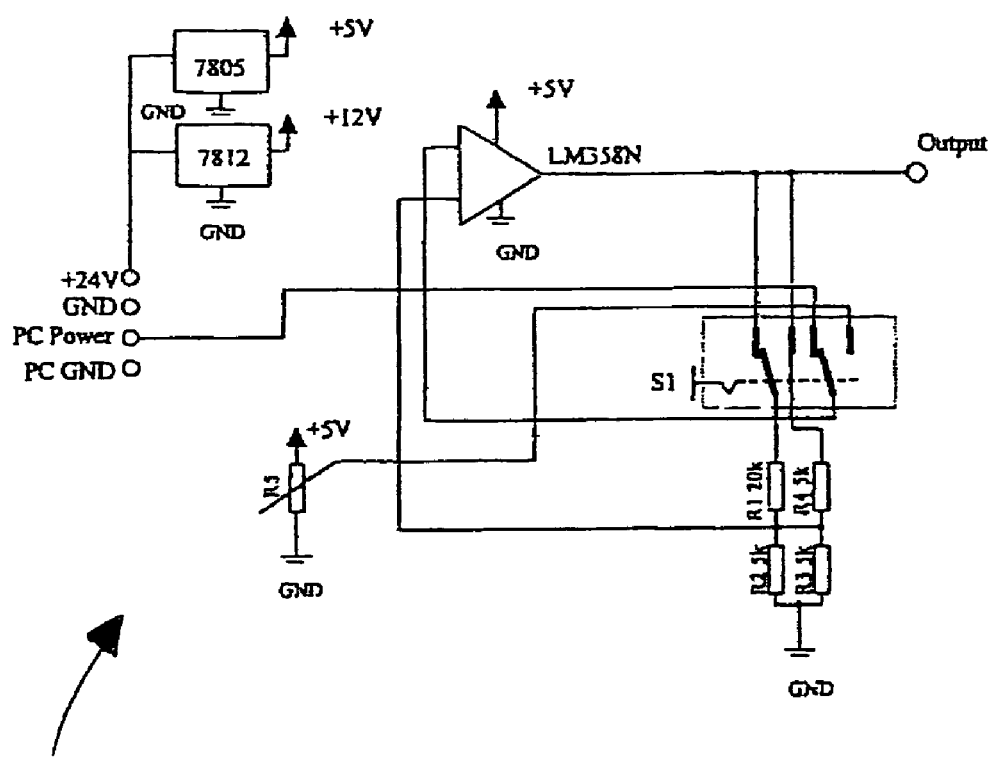
FIG. 12 is a schematic of an amplier for use in the $CO_2$ flow control hardware in accordance with the present invention.

From the low-pressure side (i.e., secondary side), the $CO_2$ is then conducted to a proportional valve 20. An exemplary proportional valve 20 is one manufactured by Asco-Joucomatic; however, it is to be understood that any suitable proportional valve may be used. Such a proportional valve should have a good response and a small error with reference to the specified $CO_2$ flow. In a desirable embodiment, the proportional valve 20 is actuated with a multi-function data reception card 22, such as that supplied by National Instruments, that is integrated into the computer and controlled by software thereof. The data reception card 22 includes two analog outputs and is configured to output a voltage between 0 and 2 volts. The voltage may be adjusted by the user proportionally to the desired flow. The resultant signal is adjusted via an amplifier circuit 24 designed for valve actuation. A circuit schematic of the exemplary amplifier circuit 24 is depicted in FIG. 12. For the realization of a precise $CO_2$ flow, the ratio of voltage and $CO_2$ is determined and stored in the software in the form of a calibration curve.

As shown in FIG. 11A, the ASL 5000, similar to any other prior art lung simulator, includes a piston/cylinder arrangement 30 for receiving air therein. The piston/cylinder arrangement 30 includes a piston 31. The piston/cylinder arrangement 30 receives the air via an inlet 25 and provides the air into a cylinder chamber C. However, with respect to the present invention, preferably, a controlled application of $CO_2$ into the chamber C is to be carried out to achieve the maximum possible mixing with the air. Accordingly, $CO_2$ is introduced into the chamber C from the flow control 11 via a fluid path 26 (such as flexible tubing) connected to an inlet 27 of the piston/cylinder arrangement 30. An outlet 28 of the piston/cylinder arrangement 30 is used to release the air and the $CO_2$. In operation, movement of the piston in a direction 29a corresponds to inhalation and results in the introduction of the air into the chamber C. Conversely, movement of the piston in a direction 29b corresponds to exhalation and results in the release or exhaust of the air and the $CO_2$ from the chamber C.

Desirably, the requirement for a $CO_2$ application is the smallest possible deviation of the $CO_2$ flow from the specified flow. In addition, the maximum deviation should not have any significant effect on the respiratory response. In a desirable embodiment, the maximum $CO_2$ flow into the piston/cylinder arrangement 30 is one liter per minute and the minimum flow is 100 ml per minute. The lower limit of 100 ml per minute may be the smallest flow that can be set, and the upper limit of one liter per minute may result from the limitation of the existing lung simulator, e.g., the ASL 5000, to simulate a sufficiently large tidal volume as well as a significantly high respiration frequency. The objective of the introduction of $CO_2$ is to obtain a homogeneous mixing. Inhomogeneities cause partial pressure peaks that result from local and temporarily elevated concentrations of $CO_2$. Any inhomogeneities lead to an atypical reaction of tidal volume and respiration frequency. Partial pressure peaks also distort the capnogram diagrams. To eliminate these problems, a silicone hose 32 may be attached to the inlet 27. As shown in FIG. 11B, a portion of the hose 32 assumes the shape of a spiral, serpentine or leporello. In the exemplary embodiment, the silicone hose 32 has an inside diameter of three millimeters; however, it is to be understood that other sized diameters may be desirable in connection with other applications or other sized piston/cylinder arrangements. Desirably, the hose 32 includes a plurality of holes 33, which ensure that $CO_2$ is distributed thoroughly and uniformly within the chamber C. In the exemplary embodiment, the holes 33 have an inside diameter of 0.06 millimeters; however, it is to be understood that other sized diameters may be desirable in connection with other applications or other sized hoses 32. In an alternate embodiment, instead of the holes, the hose 32 may have a diffusing surface made from a membrane material allowing for easy permeation of $CO_2$ across the entire piston area. Alternatively, the hose 32 may be replaced with a sheet 34 (shown in phantom) to create a plenum chamber 35. The sheet 34 may be perforated or made of a material that permits the $CO_2$ to diffuse therethrough into the chamber C. Either the hose 32 or the sheet 34 may be secured to a planar surface 36 of the piston 31. Desirably, the piston 31 is situated such that a cross-sectional plane 37 of the cylinder is substantially parallel to the planar surface 36 of the piston 31. Accordingly, the diffusing surface, such as the sheet 34, substantially evenly distributes the $CO_2$ across the cross-sectional plane 37 of the cylinder. Desirably, the $CO_2$ is introduced only during the inspiration, and the eddies that are formed by the inspiration in the cylinder further contribute to the mixing. Introduction of the $CO_2$ during the inspiration and expiration or only during the expiration leads to a severe distortion of the capnograms and to false respiratory responses.

In addition to the aforementioned hardware modifications, the present invention encompasses new software or modifications to existing software responsible for controlling the ASL 5000, or other suitable prior art lung simulator. Such software accommodates the added functionality brought about by the hardware modifications. In the desirable embodiment, the software is operative on the computer that is communicatively connected to the ASL 5000. Exemplary software may be written using the Labview programming system of National Instruments and may be based on the "G" programming language. In general, the software is operative on the flow control hardware 10.

Figure 13:
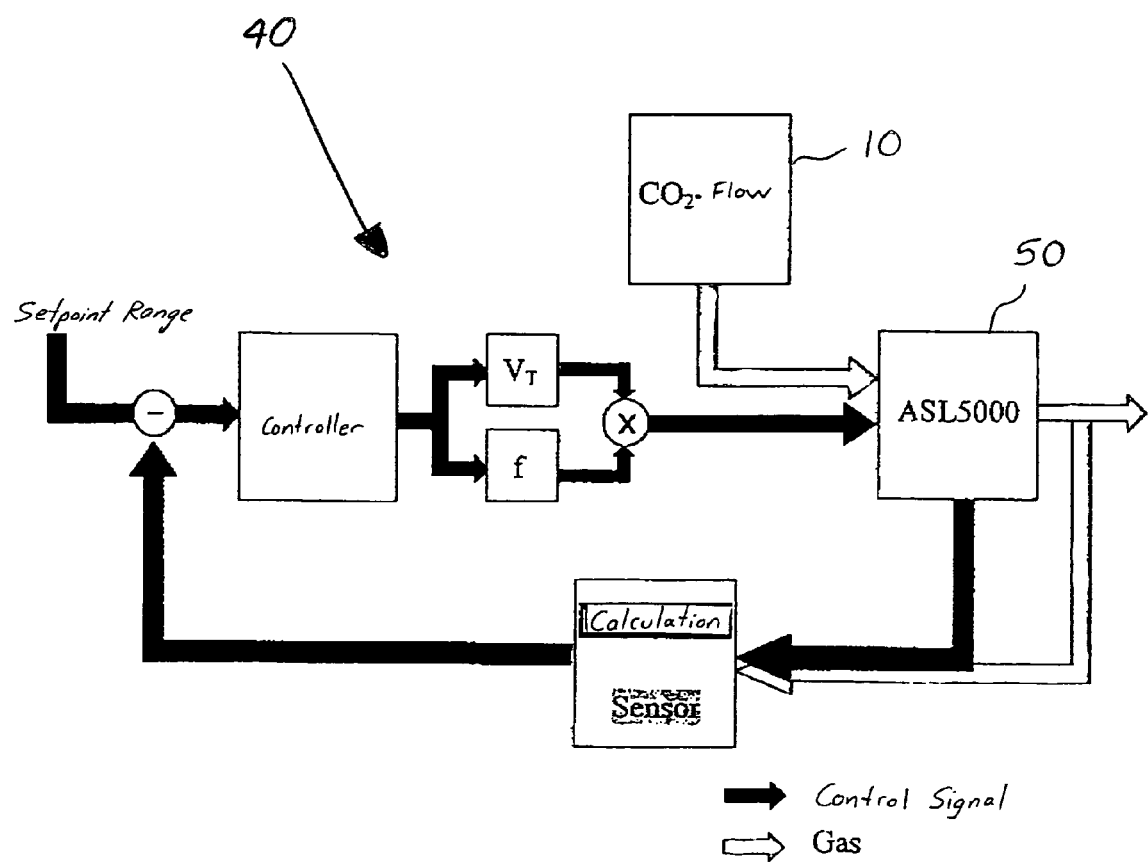
FIG. 13 is a schematic of a respiration closed-loop control system in accordance with the present invention.

With continuing reference to FIG. 11A, FIG. 13 depicts a schematic of a simulation respiration closed-loop control system 40 according to a desirable embodiment. The flow control hardware 10 is connected to the ASL 5000, or other suitable lung simulator 50. As previously mentioned, $CO_2$ is introduced into the piston/cylinder arrangement 30 only during the inspiration at a specified quantity of $CO_2$ per minute. The time of actuation of the valve 20 and determination of the quantity of $CO_2$ are triggered by data received from the ASL 5000.

Although piston movement within the piston/cylinder arrangement 30 and the display of the data on the computer may occur in real time, there may be a delay, for example, of approximately 0.5 seconds, between the display and the related data processing and the piston movement. To eliminate partial pressure peaks, this delay is compensated for by activating the valve 20a time substantially equal to the delay time (e.g., 0.5 seconds) before the beginning of the inspiration.

Figure 14:
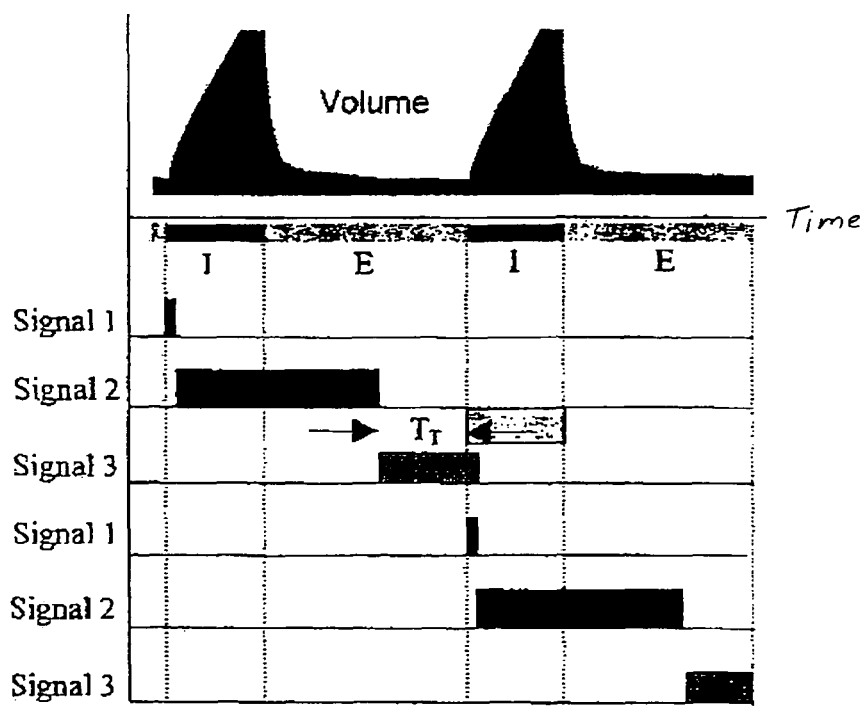
FIG. 14 is a graph depicting valve actuation during a mechanical respiration in accordance with the present invention.

FIG. 14 depicts the valve actuation during a mechanical respiration cycle. Specifically, the curved area corresponds to the tidal volume during a mechanical respiration. Signal 1 is the trigger signal for the beginning of the inspiration, and with a descending slope Signal 1 controls Signal 2. The duration of Signal 2 equals the expiration time. After the completion of the expiration time, Signal 3 is started by the descending slope of Signal 2. The length of Signal 3 equals the inspiration time. Signal 3 is the signal for the start and duration of the actuation of the valve. Signal 3 begins before the actual inspiration. However, the valve responds later, on account of the signal delay, marked as "$T_t$", so that the actual time of admission and the duration of admission coincide with the actual piston movement (i.e., inspiration). The valve is thereby triggered independently of the length of the inspiration and expiration time to match the piston movement.

The user can control the magnitude of the $CO_2$ flow by a "gate valve" or the like, which is operative through the software. Because $CO_2$ is injected only during the inspiration, the actual quantity of $CO_2$ in the inspiration time must be greater than the specified quantity, to compensate for the quantity of $CO_2$ not injected during the expiration time. The correct quantity is calculated according to Formula (12).

$$\dot{V}_{measured} = \frac{CO_2 Flow_{specified} \cdot 60}{\text{Respiratory frequency} \cdot \text{Inspirationtime}} \quad (12)$$

The recorded characteristic of the proportional valve gives an indication of what voltage must be set, so that the desired quantity of $CO_2$ is injected into the piston/cylinder arrangement 30.

Figure 15:
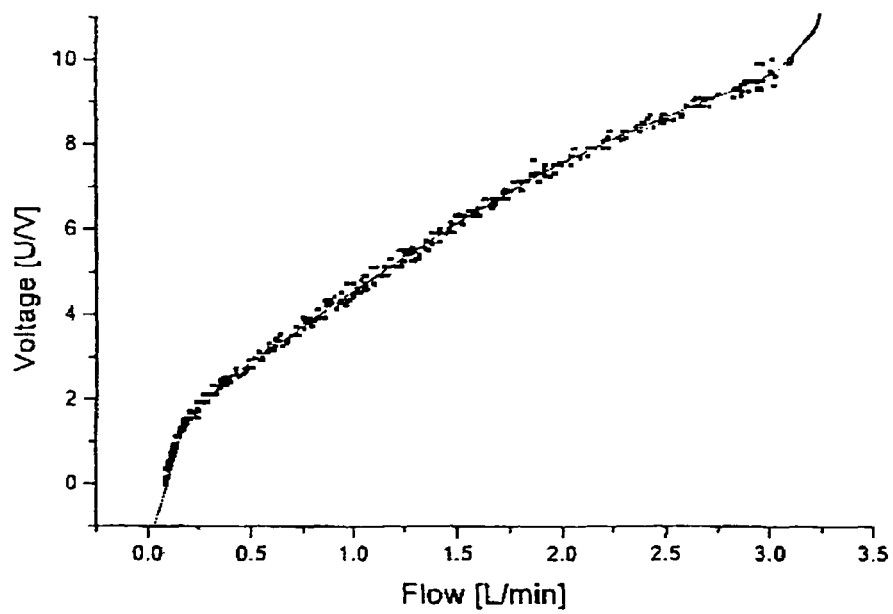
FIG. 15 is a graph of a curve representative of the characteristic of a proportional valve of the flow control hardware of FIG. 11A.

The flow quantity determined by Formula (12) is associated with a voltage by means of the characteristic curve or an equation, as shown in the graph of FIG. 15. The line of the graph represents a segment of a polynomial equation based on a regression analysis. The points grouped around the line are the measurements obtained during the recording of the characteristic curve. This voltage triggers the valve on a delayed basis and applies the desired quantity of $CO_2$. To simulate a physiological reaction to the quantity of $CO_2$ applied, the measured $CO_2$ partial pressure values or the $CO_2$ partial pressure values calculated for each operating mode are transmitted to a control algorithm.

The resulting $CO_2$ concentration in the piston/cylinder arrangement 30 is proportional to the $CO_2$ partial pressure and is detected via a sensor 55 (e.g., infrared) or determined by an algorithm. Depending on the magnitude of the partial pressure, the MV is increased or decreased. At a constant $CO_2$ flow, the $CO_2$ partial pressure is thus increased when the MV decreases, which is caused by the increasing volume proportion of the $CO_2$ gas. Conversely, the partial pressure is reduced when the MV increases, in which case the $CO_2$ is "exhaled" more rapidly and the volume proportion of the $CO_2$ gas decreases. In both cases, the MV increases the variable which is required to achieve the partial pressure.

Figure 7:
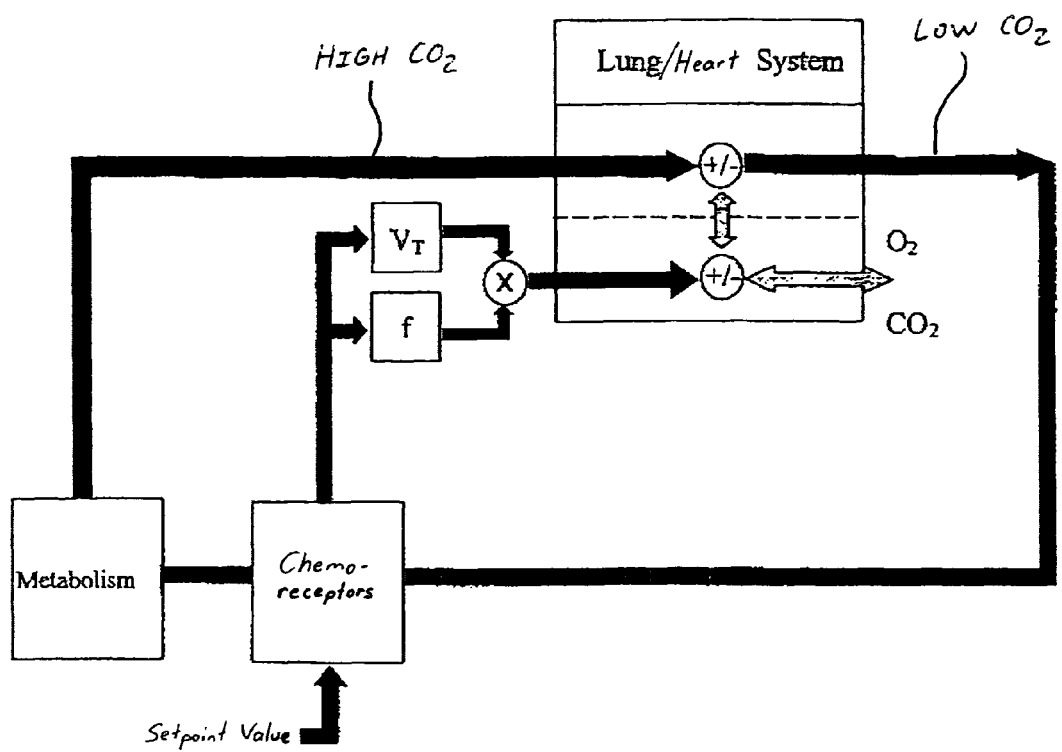
FIG. 7 is a schematic of a respiration closed-loop control system.
Figure 8:
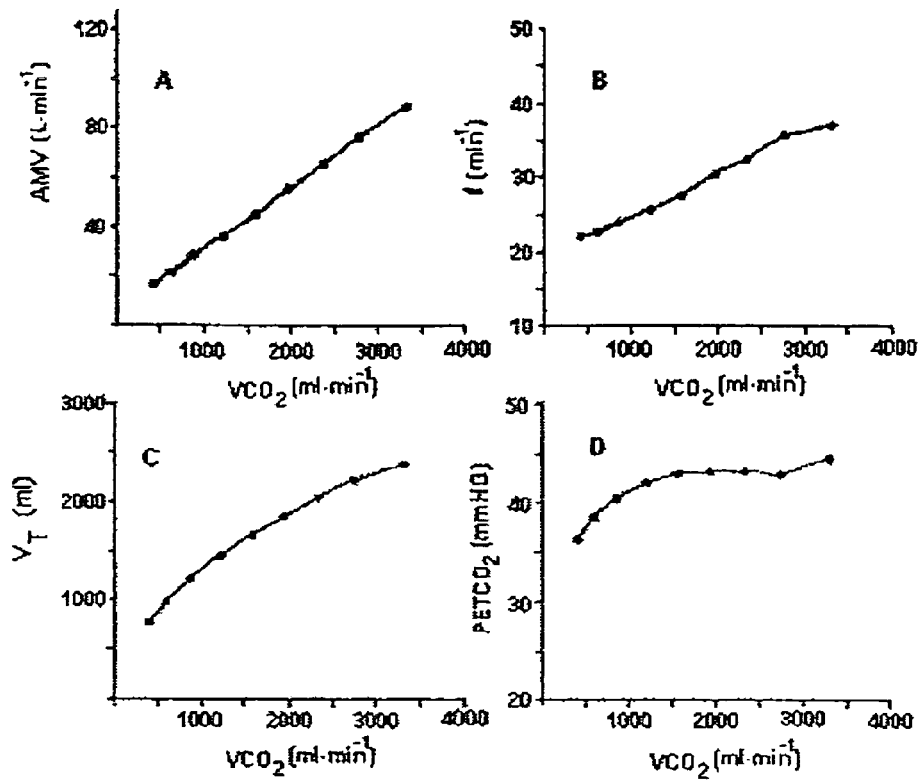
FIG. 8 is a comparison of four graphs depicting a response of tidal volume, frequency, MV and $EtCO_2$, respectively, as a function of $CO_2$ flow.

The following table analogizes the aspects of the respiration closed-loop control system of FIG. 7 to the corresponding aspects of the simulation respiration closed-loop control system 40 of FIG. 13.

| Respiration closed-loop control system | Simulation of the respiration closed-loop control system |
| --- | --- |
| Metabolism → | $CO_2$ flow |
| Tidal volume and respiration frequency | Tidal volume and respiration frequency |
| Lung/heart system → | Cylinder of the ASL 5000 |
| Chemo-receptors → | Calculation/Sensor and controller |

The $CO_2$ flow or the $CO_2$ control represents the metabolism. The metabolism is not directly integrated in the closed-loop control system, but acts as a disturbance variable which influences the closed-loop control system. In both FIGS. 7 and 13, the tidal volume and respiration frequency are influenced by special signals. In biology, these signals are nerve impulses to the respiratory system, and in the simulation they are electrical signals to the motor of the ASL 5000. The ASL 5000 itself replaces a part of the lung/heart system, whereby the simulation of the heart is not taken into consideration. The calculation or measurement of the $CO_2$ partial pressure corresponds to the chemo-receptors.

As shown in FIG. 13, there are two feedback variables. A distinction exists between the types of feedback depending on which mode is selected. In Operating Modes 1 and 2, the $CO_2$ partial pressure is calculated with Equation (13).

$$EtCO_2 = \frac{\dot{V} \cdot P_{Baro} \cdot 7.5006}{V_t \cdot k \cdot f} \tag{13}$$

In this case, $EtCO_2$ is the partial pressure, $\dot{V}$ is the $CO_2$ flow, $P_{Baro}$ is the barometric pressure, the number 7.5006 is a desirable conversion factor for the unit mmHg (millimeters of column of mercury), "$V_t$" is the tidal volume and "f" is the respiration frequency. It is to be understood that any suitable conversion factor may be used. Tidal volume, respiration frequency and barometric pressure are the data taken from the ASL 5000, which are then used for the calculation. Equation (13) reflects the ratio of the $CO_2$ volume and tidal volume and is proportional to the partial pressure. The letter "k" is an experimentally determined correction factor for the determination of the correct partial pressure. FIG. 13 discloses a schematic illustration of Operating Mode 1 and Mode 2 in the form of a black arrow from the ASL 5000 returning to the "calculation" component. The "calculation" component then transmits the calculated $EtCO_2$ value to the controller. In Mode 3, the $CO_2$ partial pressure is measured by the sensor situated at the outlet of the ASL 5000. The sensor feeds the measured $EtCO_2$ value back to the controller. In FIG. 13, the white arrow represents Mode 3 from the ASL 5000 returning to the sensor.

Figure 16:
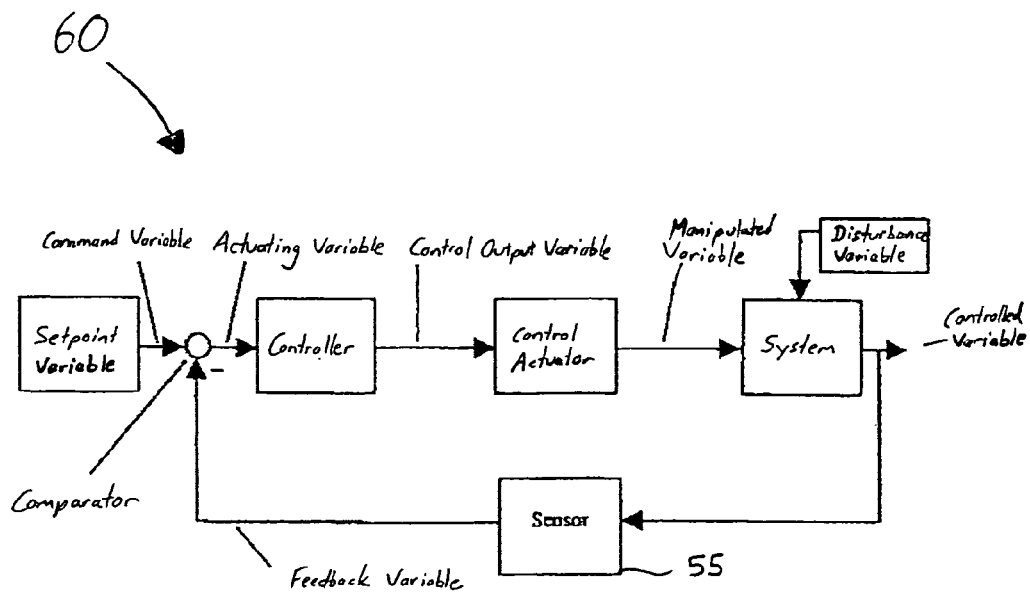
FIG. 16 is a block diagram of the closed-loop control system of FIG. 13.

In the foregoing closed-loop control system 40, specified segments are associated with the different areas of a control circuit 60, as illustrated in FIG. 16. The "command variable" is a variable that results from the setpoint variable. In the context of the closed-loop control system 40, the command variable is the same as the setpoint variable and is the $EtCO_2$ value to be set by the user. This setpoint variable is compared with the feedback variable, which is also referred to as the actual value. The difference between the two signals, which is the actuating variable, is fed to the controller. The actuator converts the controller output variables into a variable referred to as the manipulated variable. The manipulated variable is the signal for the motor of the ASL 5000 and represents the respiration effort. The "system" is the part of the system to be influenced, and is represented by the ASL 5000 or other suitable lung simulator. The sensor (infrared sensor/calculation) is the functional unit specified for the pickup of the measurements, and forms the feedback variable, or the $EtCO_2$ value, as specified for the comparator. The disturbance variable in a control system is a variable that acts from outside and influences the control variables. The disturbance variable is the change in the $CO_2$ flow or the external ventilation by a respirator unit.

The controller and controlled system may be of different types depending on the system to be controlled. Basically, there are three types of controllers, which can also be connected to one another. On proportional controllers, each actuating variable is associated with a specific value, which is a function of the magnitude of the actuating variable. An error causes a sudden change in the manipulated variable. On integral controllers, each actuator variable is associated with a specific regulating speed. If there are actuating variables, there is a more or less rapid change in the manipulated variable. On differential controllers, each speed of change of the error is associated with a specific value of the manipulated variable, depending on the magnitude of the change.

Control systems are primarily classified by their time response. If the controlled variable follows the manipulated variable and is proportional, the system is called a P system. If the tracking by the controlled variable of the manipulated variable is delayed, the system is called a $PT_X$ system by analogy to the P controller. An "integral" control system is a system without compensation. If the manipulated variable is not equal to zero, the integral control system does not assume an equilibrium state; it rises or falls continuously. In practice, the integral behavior usually has a limit on account of the system. Integral systems can also have response delays, and in a system with a response delay, a change in the manipulated variable only affects the controlled variable after a certain length of time. The designation is by analogy to the P system, and is called an $IT_X$ system, where "x" indicates the magnitude of the delay.

The response of the control system must also be adjusted to match the physiological response. The magnitude and increase of the respiration frequency and of the tidal volume must match the physiological model. For this purpose, first the response of the control system to disturbances must be investigated and then a suitable controller must be identified. In the present invention, the system response to disturbances was investigated with a command variable of zero and a disturbance variable not equal to zero.

Figure 17:
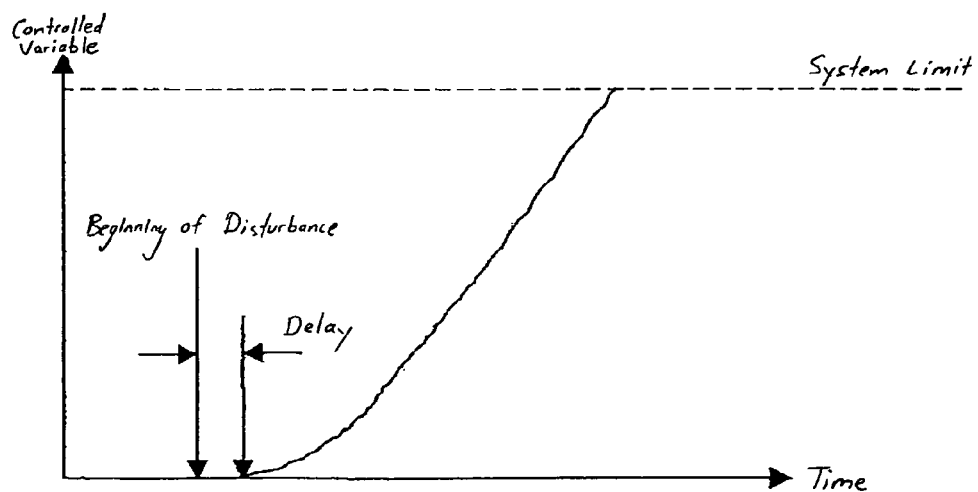
FIG. 17 is a graph of a disturbance in the closed-loop control system of FIG. 13.

FIG. 17 shows the system response of the ASL 5000 to a disturbance. If $CO_2$ is injected into the piston/cylinder arrangement 30, first, an equalization occurs on account of the limitation of the cylinder volume, and then the $CO_2$ concentration rises until it reaches 100%. The system also includes a delay, and the rise of the $CO_2$ is detected only some time after the start of the $CO_2$ injection. The response illustrated in FIG. 17 is the same as an $IT_X$ system, in which case the "x" stands for the delay time. The delay is a function of the disturbance variable and therefore cannot be specifically defined.

It is to be understood that delay times are generally a problem in control engineering. In the simulation of the respiratory response to a $CO_2$ partial pressure (closed-loop control system), the delays are a function of the $CO_2$ flow rate, the respiratory mechanics and the software used to control the ASL 5000. To keep delays as short as possible, a proportional controller was selected for the control system. A specified value is associated with each actuating variable. The proportional controller also accurately reflects the biological respiration regulation, in which a specified MV is associated with each actuating variable.

$$y = k_P \cdot e \qquad (14)$$

Figure 9:
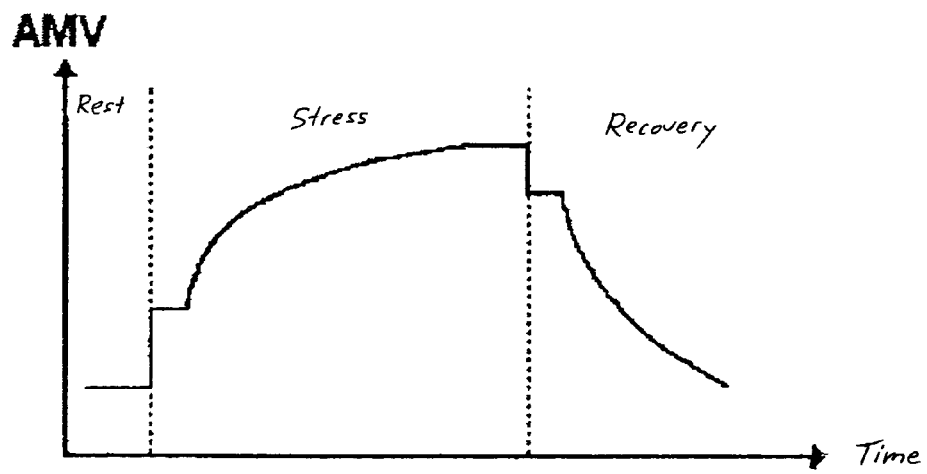
FIG. 9 is a graph depicting equilibrium between stress and MV.

Formula (14) describes this relationship, where "y" is the controller output variable, "e" is the actuating variable and "$k_P$" is an amplification factor. If "e" equals zero, the manipulated variable is unchanged. If "e" is not equal to zero, the manipulated variable is amplified as a function of "$k_P$." With reference to the closed-loop control system illustrated in FIG. 13, "$k_P$" influences the magnitude of the respiration frequency and of the tidal volume, as well as the time until the realization of the plateau illustrated in FIG. 9.

The invention has been described with reference to the desirable embodiments. Modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A system for delivering $CO_2$ in a respiration closed-loop control system to a respiratory simulator, the system comprising:
    a piston/cylinder arrangement having:
        a first inlet for receiving a volume of air during an inhalation phase;
        a second inlet for receiving $CO_2$; and
        an outlet for releasing the air and $CO_2$ therethrough during an exhalation phase;
    a $CO_2$ supply connected to the piston/cylinder arrangement via a fluid path;
    a valve situated along the fluid path between the $CO_2$ supply and the piston/cylinder arrangement;
    a diffusing surface situated within the piston/cylinder arrangement for distributing the $CO_2$ within the cylinder; and
    a controller configured to:
        actuate the valve after the inhalation phases to allow a predefined amount of $CO_2$ to flow into the piston/cylinder arrangement to mix with the volume of air forming a volume containing the air and the added $CO_2$ to be released from the system in the exhalation phase thereof, wherein the predefined amount of $CO_2$ in combination with the air received during the inhalation phase emulates the amount of $CO_2$ released in an exhalation phase of a patient; and
        receive a first control signal representative of the predefined amount of $CO_2$, wherein only $CO_2$ is added to the air in the piston/cylinder arrangement prior to the exhalation phase.

2. The system of claim 1, wherein the diffusing surface substantially evenly distributes the $CO_2$ across a cross-sectional plane of the cylinder, and wherein the cross-sectional plane of the cylinder is substantially parallel to a planar surface of the piston.

3. The system of claim 2, wherein the diffusing surface is one of:
    a substantially tubular structure connected to the fluid path and situated on the planar surface of the piston in a substantially spiral arrangement, wherein the tubular structure includes a plurality of holes for accommodating the $CO_2$ therethrough; and
    a permeable membrane connected to the fluid path and situated on the planar surface of the piston, wherein the permeable membrane is adapted to transmit the $CO_2$ therethrough.

4. The system of claim 1, further comprising a computing unit connected to the controller, wherein the computing unit is configured to:
    transmit the first control signal to the controller;
    one of:
        determine an end-tidal carbon dioxide partial pressure ($EtCO_2$) value based on an amount of $CO_2$ emptied from the piston/cylinder arrangement during an exhalation phase during an exhalation phase of the respiratory simulator; and
        calculate an end-tidal carbon dioxide partial pressure ($EtCO_2$) value; and
    generate a second control signal representative of a tidal volume and a breathing frequency representative of a physiological response to the $EtCO_2$ value to effect corresponding movement of the piston in a next inhalation and exhalation phase.

5. The system of claim 4, further comprising an infrared sensor fluidly connected to the respiratory simulator, wherein the infrared sensor is configured to measure the amount of $CO_2$ emptied from the piston/cylinder arrangement.

6. The system of claim 4, wherein the amount of $CO_2$ is a function of moved volume and concentration of the $CO_2$ emptied from the piston/cylinder arrangement.

7. The system of claim 4, wherein the computing unit includes software operative for calculating the $EtCO_2$ value by the equation:

$$EtCO_2 = \frac{\dot{V} \cdot P_{Baro} \cdot \text{mmHg\_conversion\_factor}}{V_t \cdot k \cdot f}$$

wherein $\dot{V}$ is the $CO_2$ flow, $P_{Baro}$ is the barometric pressure, and $V_t$ is the tidal volume, "f" is the respiration frequency and "k" is an experimentally determined correction factor for the determination of the correct partial pressure.

8. The system of claim 1, wherein the valve is one of:
    a proportional valve; and
    an on/off valve adapted to provide pulse-width modulation.

9. The system of claim 4, further comprising:
    a pressure reducer situated along the fluid path between the $CO_2$ supply and the valve; and
    an amplifier situated in electrical communication between the computing unit and the valve.

10. A method of delivering $CO_2$ in a respiration closed-loop control system to a respiratory simulator, the method comprising the steps of:
    providing a $CO_2$ supply to the respiratory simulator having a piston/cylinder arrangement;
    providing flow control hardware between the $CO_2$ supply and the piston/cylinder arrangement;
    generating a first control signal representative of a predefined amount of $CO_2$;
    moving the piston in a first direction to draw a volume of air into the piston/cylinder arrangement during an inhalation phase;
    providing the predefined amount of $CO_2$ into the piston/cylinder arrangement after the inhalation phase to mix the $CO_2$ and the air forming a volume containing air and the added $CO_2$ to be released in an exhalation phase, wherein only the $CO_2$ is added to the air in the piston/cylinder arrangement prior to the exhalation phase, whereby the release of the $CO_2$ is synchronized with a breathing pattern of the respiratory simulator;

moving the piston in a second direction to empty the $CO_2$ and the air from the piston/cylinder arrangement in the exhalation phase, wherein the predefined amount of $CO_2$ in combination with the air received during the inhalation phase emulates the amount of $CO_2$ released in an exhalation phase of a patient;

one of:
- determining an end-tidal carbon dioxide partial pressure ($EtCO_2$) value based on an amount of $CO_2$ emptied from the piston/cylinder arrangement during an exhalation phase of the respiratory simulator; and
- calculating an end-tidal carbon dioxide partial pressure ($EtCO_2$) value; and generating a second control signal representative of a tidal volume and a breathing frequency representative of a physiological response to the $EtCO_2$ value to effect corresponding movement of the piston in a next inhalation and exhalation phase.

11. The method of claim 10, further comprising an infrared sensor fluidly connected to the respiratory simulator, wherein the infrared simulator sensor is configured to measure the amount of $CO_2$ emptied from the piston/cylinder arrangement.

12. The method of claim 11, wherein the amount of $CO_2$ is a function of moved volume and concentration of the $CO_2$ emptied from the piston/cylinder arrangement.

13. The method of claim 10, wherein the $EtCO_2$ value is calculated by the equation:

$$EtCO_2 = \frac{\dot{V} \cdot P_{Baro} \cdot \text{mmHg\_conversion\_factor}}{V_t \cdot k \cdot f}$$

wherein $\dot{V}$ is the $CO_2$ flow, $P_{Baro}$ is the barometric pressure, and $V_t$ is the tidal volume, "f" is the respiration frequency and "k" is an experimentally determined correction factor for the determination of the correct partial pressure.

14. The method of claim 10, wherein the predefined amount of $CO_2$ is released into the piston/cylinder arrangement during an inhalation phase of the respiratory simulator.

15. The method of claim 10, wherein the second control signal is further generated based upon a predefined patient respiratory breathing profile.

16. The method of claim 10, wherein the $CO_2$ is released substantially across one of:
- a surface of the piston; and
- a side of the cylinder opposite from the surface of the piston.

17. The method of claim 10, wherein the flow control hardware comprises:
- a valve situated along a fluid path between the $CO_2$ supply and the piston/cylinder arrangement; and
- a controller configured to:
  - actuate the valve to allow the predefined amount of $CO_2$ to flow into the piston/cylinder arrangement; and
  - receive the first control signal representative of the predefined amount of $CO_2$.

18. The method of claim 17, wherein the flow control hardware further comprises:
- a computing unit;
- a pressure reducer situated along the fluid path between the $CO_2$ supply and the valve; and
- an amplifier situated in electrical communication between the computing unit and the valve.

19. The method of claim 18, wherein the computing unit generates the first and second control signals.

20. A system for delivering $CO_2$ in a respiration closed-loop control system to a respiratory simulator, the system comprising:
- a piston/cylinder arrangement having:
  - a first inlet for receiving air;
  - a second inlet for receiving $CO_2$; and
  - an outlet for releasing the air and $CO_2$ therethrough;
- a $CO_2$ supply connected to the piston/cylinder arrangement via a fluid path;
- a valve situated along the fluid path between the $CO_2$ supply and the piston/cylinder arrangement;
- a diffusing surface situated within the piston/cylinder arrangement for distributing the $CO_2$ within the cylinder; and
- a controller configured to:
  - actuate the valve to allow a predefined amount of $CO_2$ to flow into the piston/cylinder arrangement; and
  - receive a first control signal representative of the predefined amount of $CO_2$.

* * * * *

UNITED STATES PATENT AND TRADEMARK OFFICE
CERTIFICATE OF CORRECTION

| | | |
|---|---|---|
| PATENT NO. | : 7,959,443 B1 | |
| APPLICATION NO. | : 11/520025 | |
| DATED | : June 14, 2011 | |
| INVENTOR(S) | : Stefan Frembgen | |

It is certified that error appears in the above-identified patent and that said Letters Patent is hereby corrected as shown below:

Column 21, Line 26, Claim 11, after "infrared" delete "simulator"

Signed and Sealed this
Eighteenth Day of October, 2011

David J. Kappos
*Director of the United States Patent and Trademark Office*